United States Patent
Acharya et al.

(10) Patent No.: US 7,058,946 B2
(45) Date of Patent: Jun. 6, 2006

(54) ADAPTIVE SCHEDULING OF DATA DELIVERY IN A CENTRAL SERVER

(75) Inventors: Swarup Acharya, New Providence, NJ (US); Shanmugavelayut Muthukrishnan, New York, NY (US); Ganapathy Sundaram, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 2 days.

(21) Appl. No.: 10/659,757

(22) Filed: Sep. 10, 2003

(65) Prior Publication Data

US 2004/0083477 A1    Apr. 29, 2004

Related U.S. Application Data

(63) Continuation of application No. 09/336,981, filed on Jun. 21, 1999, now abandoned.

(51) Int. Cl.
  *G06F 9/46* (2006.01)
  *H04Q 7/00* (2006.01)
  *H04Q 7/28* (2006.01)

(52) U.S. Cl. .................... 718/102; 718/100; 370/329; 370/341

(58) Field of Classification Search ........ 370/200–399; 718/100–108
See application file for complete search history.

(56) References Cited

U.S. PATENT DOCUMENTS

| | | | | |
|---|---|---|---|---|
| 5,261,099 A | * | 11/1993 | Bigo et al. ................. | 718/102 |
| 5,615,371 A | * | 3/1997 | Iuchi .......................... | 717/129 |
| 6,112,221 A | * | 8/2000 | Bender et al. .............. | 718/102 |
| 6,338,130 B1 | * | 1/2002 | Sinibaldi et al. ............. | 712/35 |
| 6,434,589 B1 | * | 8/2002 | Lin et al. .................... | 718/100 |
| 6,502,062 B1 | * | 12/2002 | Acharya et al. ............ | 702/186 |
| 6,571,391 B1 | * | 5/2003 | Acharya et al. ............. | 725/87 |

* cited by examiner

*Primary Examiner*—Meng-Al T. An
*Assistant Examiner*—Kenneth Tang

(57) ABSTRACT

In accordance with one embodiment of the invention, a central server system computes a feasible stretch value for use in scheduling the servicing of job requests by a plurality of communication channels. A stretch value provides an indication of the delay experienced by each job request to complete, when the central server processes many jobs concurrently. A processing time is calculated for each job request based on the size of the job request and the bandwidth of the channel. Thereafter, a stretch value is proposed. The server system computes a deadline for each job to be the arrival time of the job request plus the product of the processing time and the proposed stretch value. Thereafter, each job request is scheduled, based on an "earliest deadline first" arrangement. According to the EDF methodology, the central server schedules for service, via k local channel servers, the job requests, such that the k job requests which have the earliest deadlines are serviced first by the k local channel servers and the remaining job requests are subsequently serviced as the local channel servers become available. The proposed stretch value is deemed feasible if each pending job request can be completed prior to its deadline. If the proposed stretch value is deemed not feasible, it is adjusted iteratively until a feasible stretch value is found. The feasible stretch value is then utilized to schedule the job requests to be serviced by the channels.

26 Claims, 5 Drawing Sheets

FIG. 5

| MAXIMIUM STRETCH | 23.2 |
|---|---|
| AVERAGE STRETCH | 9.8 |
| AVERAGE RESPONSE TIME | 12.9 (sec) |

FIG. 6

| ALGORITHM | STRETCH | | RESPONSE TIME (sec) | |
|---|---|---|---|---|
| | MAXIMUM | AVERAGE | MAXIMUM | AVERAGE |
| SRPT | 34.4 | 1.1 | 11878 | 3.9 |
| MAX | 23.98 | 1.3 | 11775 | 5.2 |
| BASE | 24.09 | 1.08 | 11807 | 4.2 |

ADAPTIVE SCHEDULING OF DATA DELIVERY IN A CENTRAL SERVER

CROSS-REFERENCE TO RELATED APPLICATION

This application is a continuation of U.S. application Ser. No. 09/336,981, filed Jun. 21, 1999, now abandoned which is incorporated by reference herein.

FIELD OF THE INVENTION

This invention relates generally to communication systems, and more particularly to a centralized scheduling arrangement of job requests in a multiple-channel, point-to-point system.

BACKGROUND OF THE INVENTION

The boom in the Internet and the rise of new network technologies have focused attention on designing faster and more efficient data networks. A key component of the data network is the data server. Data servers are the engines that store and feed content to diverse clients over the network media. Data servers can take many forms, such as infestations, wireless gateways, web servers or specialized servers such as traffic or weather information servers. Increasingly, data servers employ a multiple-channel, point-to-point model.

For example, FIG. 1 illustrates a typical multiple-channel communication system of the prior art, which satisfies job requests in a point-to-point, or unicast, fashion. In a point-to-point system, each client's request for data is required to be individually satisfied, even if more than one client makes a job request for the same data item. In this regard, a point-to-point system is different from a broadcast system, which is used to advantage by satisfying all of the pending job requests for a data item with a single broadcast of the data item. One of many examples of a point-to-point system is a centralized Internet server which provides web page data in response to requests from different Internet users.

In FIG. 1, devices 30a through 30w make requests for data which are delivered to central server 10 via link 36, or by any other method. Specifically, device 30a makes a job request for data item a, device 30b makes a job request for data item b, and device 30w makes a job request for data item w. Central server 10 receives the job requests and retrieves the requested data from either an internal database or an external database (as will be shown below). Central server 10 stores the job requests in queue 12 and then transmits the requested data to one of a plurality of local channel servers, designated as 40-1 through 40-k. Each local channel server provides data to a corresponding data channel designated $C_1$ through $C_k$. When requested data is received by one of the local channel servers, the local channel server then services the job by transmitting the requested data to the requesting device via its corresponding channel. Channel servers may employ signal processors that modulate the data to appropriate channels, such as in many proposed wireless base stations.

Additionally, a scheduling arrangement is employed by the system. The scheduling arrangement determines the order in which the job requests are serviced. In the prior art, one method which is typically employed for this purpose is a centralized scheduling method. According to a centralized scheduling method, the central server has a corresponding queue, such as queue 12 shown in FIG. 1. When a job request is received by the central server, the central server stores the data in its corresponding queue along with other pending job requests which have not yet been serviced. Local channel servers service the job requests which are sent to them by the central server. When a local channel server completes a job requests, it sends a signal to the central server. The signal instructs the central server to send the next pending job request for transmission via the local channel server's corresponding channel.

According to a centralized scheduling scheme, the central server employs a scheduling algorithm in order to determine which of the jobs pending in its corresponding queue are to be sent to a local channel server so as to be serviced first. One scheduling algorithm which is typically employed by a central server in a communication system employing a centralized scheduling method is a "round-robin" arrangement. Basically, the central server assigns data relating to a job request to the next available local channel server based on a first-in first-out scheme. However, this arrangement may be unsatisfactory, specifically with widely heterogeneous data requests (heterogeneous job requests are job requests having varying sizes).

Another scheduling algorithm employed by data servers is known as the "Shortest Remaining Processing Time" (hereinafter referred to as "SRPT") algorithm. The SRPT algorithm produces a schedule which minimizes the time it takes to process all of the uncompleted jobs in a queue. The SRPT algorithm is typically employed when jobs arrive in a continuous stream, and is based upon a sum-flow metric. The relevant parameter of the sum-flow metric is the time a job spends in the system. The SRPT algorithm employs the sum-flow metric by summing the time that all jobs spend in the system, and schedules the pending jobs so as to minimize this summed amount of time.

However, the SRPT algorithm has the drawback that it leads to starvation. Starvation occurs when some job request to the server is delayed to an unbounded extent. For instance, starvation may occur when the servicing of a pending job request is continually delayed because the SRPT algorithm determines that incoming job requests are serviced prior to the pending job request. Although the SRPT algorithm can be desirable in some circumstances, the fact that specific job requests are delayed to an unbounded extent is unfair to the person who made the request which is delayed. Furthermore, the fact that some job requests are delayed to an unbounded extent prevents the owner of the server system from being able to make a quality-of-service guarantee to each user that the schedule will be responsive to each job and avoid starvation of any job.

Although the above-referenced scheduling methods have attempted to address data server performance issues, there is an ever increasing need for improved scheduling methods that provide satisfactory performance. Therefore, there exists a need for a system and method for optimally scheduling the transmission of data items in multiple-channel, point-to-point communication system.

SUMMARY OF THE INVENTION

In accordance with one embodiment of the invention, a system and method for scheduling responses in a multiple-channel, point-to-point communication system are disclosed. The method comprises the steps of receiving at a central server a plurality of job requests, and determining an adaptive schedule for servicing the job requests via the multiple channels. In a departure from prior art scheduling methods for multiple-channel, point-to-point communication systems, wherein a response to a job request is transmitted entirely before a following response is transmitted, the schedule in accordance with the present invention is adaptively determined such that the servicing of a first job request via a first channel may be interrupted and serviced via a second channel upon receipt of a new job request at the central server, so as to service a second job request in accordance with an updated schedule.

According to one embodiment, the central server updates the schedule upon the arrival of each new job request. Each time the schedule is updated by the central data server, the data corresponding to the job requests that need to be served based on the updated schedule is sent to corresponding local channel servers. In one embodiment, the first k job requests are scheduled, where k is the number of available local channel servers that can service the job request.

In accordance with another embodiment of the invention, a central server of a multiple-channel, point-to-point communication system computes a feasible stretch value for use in scheduling heterogeneous job requests to be serviced. A stretch value provides an indication of the delay experienced by each job request to complete, when the server processes many job requests concurrently. In one embodiment, for a set of job requests to be serviced in an off-line setting, a processing time is calculated for each job request based on the size of the job and the transmission speed or bandwidth of the channels. Thereafter, a stretch value is proposed and the central server computes a deadline for each job to be the arrival time of the job request plus the product of the processing time and the proposed stretch value. Thereafter, each job request is scheduled, based on an "earliest deadline first" (EDF) arrangement, wherein the job request that has the earliest deadline is scheduled first, the job request having the next earliest deadline is scheduled second, etc.

The proposed stretch value is deemed feasible if each pending job request can be completed, if performed in the order determined by the earliest deadline first methodology, prior to its deadline. If the proposed stretch value is deemed not feasible, it is adjusted iteratively until a feasible stretch value is found. Once the feasible stretch value is found, the job requests are serviced in the order dictated by the EDF schedule as found in the latest iteration. According to one embodiment, the feasible stretch value is further adjusted until an optimal feasible stretch value is found, which equals the smallest feasible stretch value which permits, when serviced in the order dictated by the EDF schedule as found in the current iteration, all pending jobs to be completed prior to their deadline.

In another embodiment, job requests are serviced by a central server in an on-line setting, in which the system services pending job requests prior to determining whether a modified stretch is feasible. In accordance with another embodiment of the invention, the system determines a schedule for a set of pending job requests as a function of all of the job requests from the arrival of the first job request to the system up to the arrival of the current job. In accordance with yet another embodiment of the invention, the system determines a schedule for a set of pending job requests as a function of the last n number of job arrivals, wherein n is an integer.

BRIEF DESCRIPTION OF THE DRAWINGS

The present invention will be further understood from the following description with reference to the accompanying drawings.

FIG. 5 is a table which illustrates the performance of an algorithm referred to as the OPT algorithm, in accordance with one embodiment of the invention; and FIG. 6 is a table which illustrates the performance of the SRPT, MAX and BASE algorithms, in accordance with one embodiment of the invention.

DETAILED DESCRIPTION OF THE INVENTION

In accordance with one embodiment, the present invention comprises a system and method for centrally scheduling the servicing of job requests for data items in a multiple-channel, point-to-point communication system. For instance, the requests for data can be made via wireless interface, over phone lines, by computer interface, etc.

Figure 1:
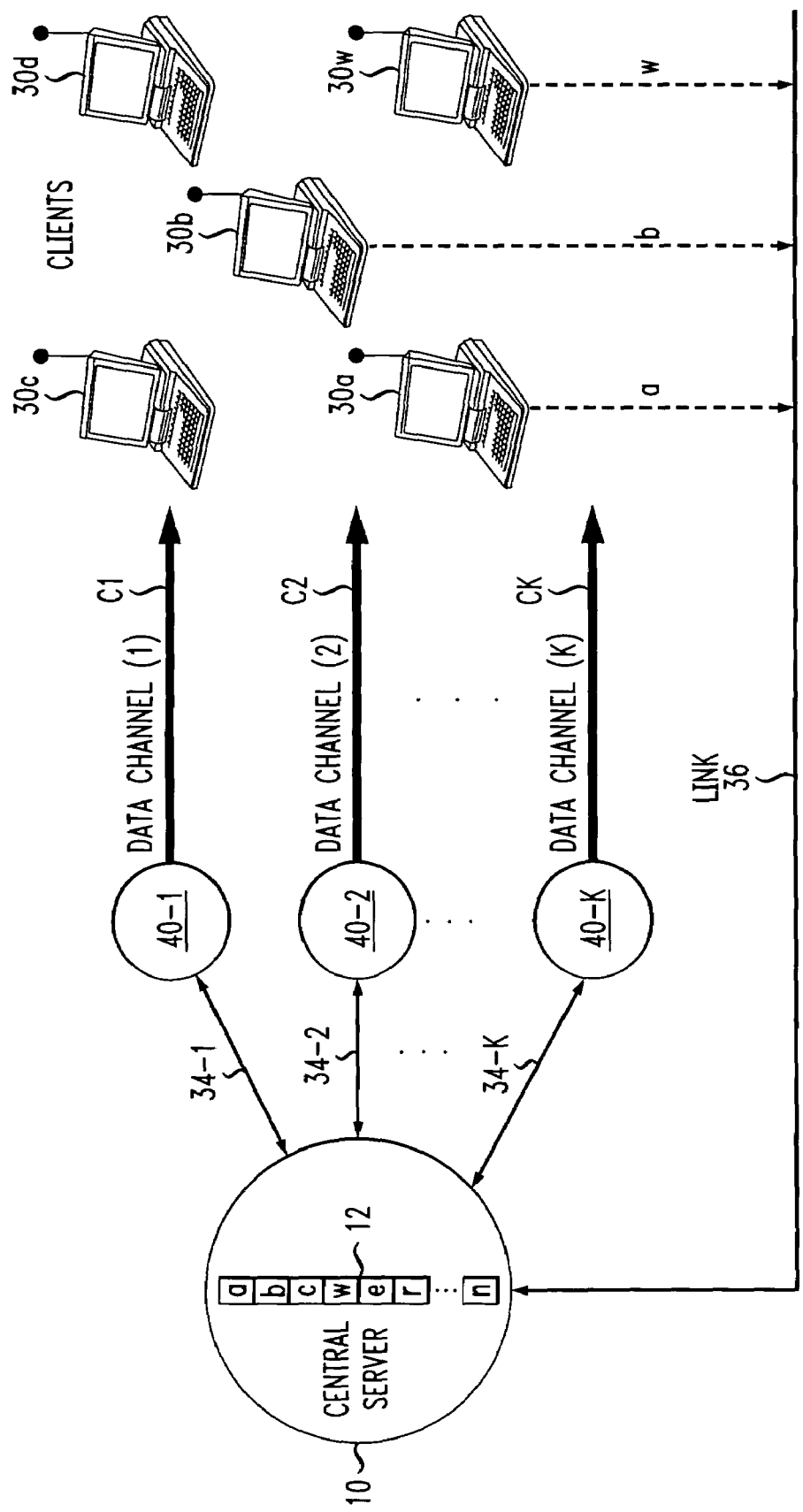
FIG. 1 illustrates a multiple-channel, point-to-point communication system, as employed in the prior art.

As previously discussed, FIG. 1 illustrates a typical multiple-channel, point-to-point communication system, which employs a centralized scheduling method. Devices 30a through 30w make requests for data which are delivered to central server 10 by any method. Specifically, device 30a makes a job request for data item a, device 30b makes a job request for data item b, and device 30w makes a job request for data item w. Central server 10 receives the job requests and retrieves the requested data from either an internal database or an external database. Central server 10 then transmits the requested data to one of the plurality of local channel servers 40-1 through 40-k, which then services the job by transmitting the requested data to the requesting device via its corresponding channel.

Central server 10 of the system employs a centralized scheduling arrangement to determine the order in which the job requests are serviced. According to a centralized scheduling method, central server has corresponding queue 12. When a job request is received by central server 10, central server 10 stores the data in queue 12 along with other pending job requests which have not yet been serviced. Local channel servers service the job requests which are sent to them by central server 10. When a local channel server completes a job request, it sends a signal to central server 10. The signal instructs central server 10 to send to the available local channel server the next pending job request for transmission via the local channel server's corresponding channel. Central server 10 employs an adaptive scheduling algorithm in order to determine which of the jobs pending in its corresponding queue are to be sent to a local channel server so as to be serviced first. According to one embodiment of the present invention, central server 10 employs an off-line scheduling algorithm referred to as a BASE algorithm. According to another embodiment of the present invention, central server 10 employs an on-line scheduling algorithm referred to as a MAX algorithm.

Figure 2:
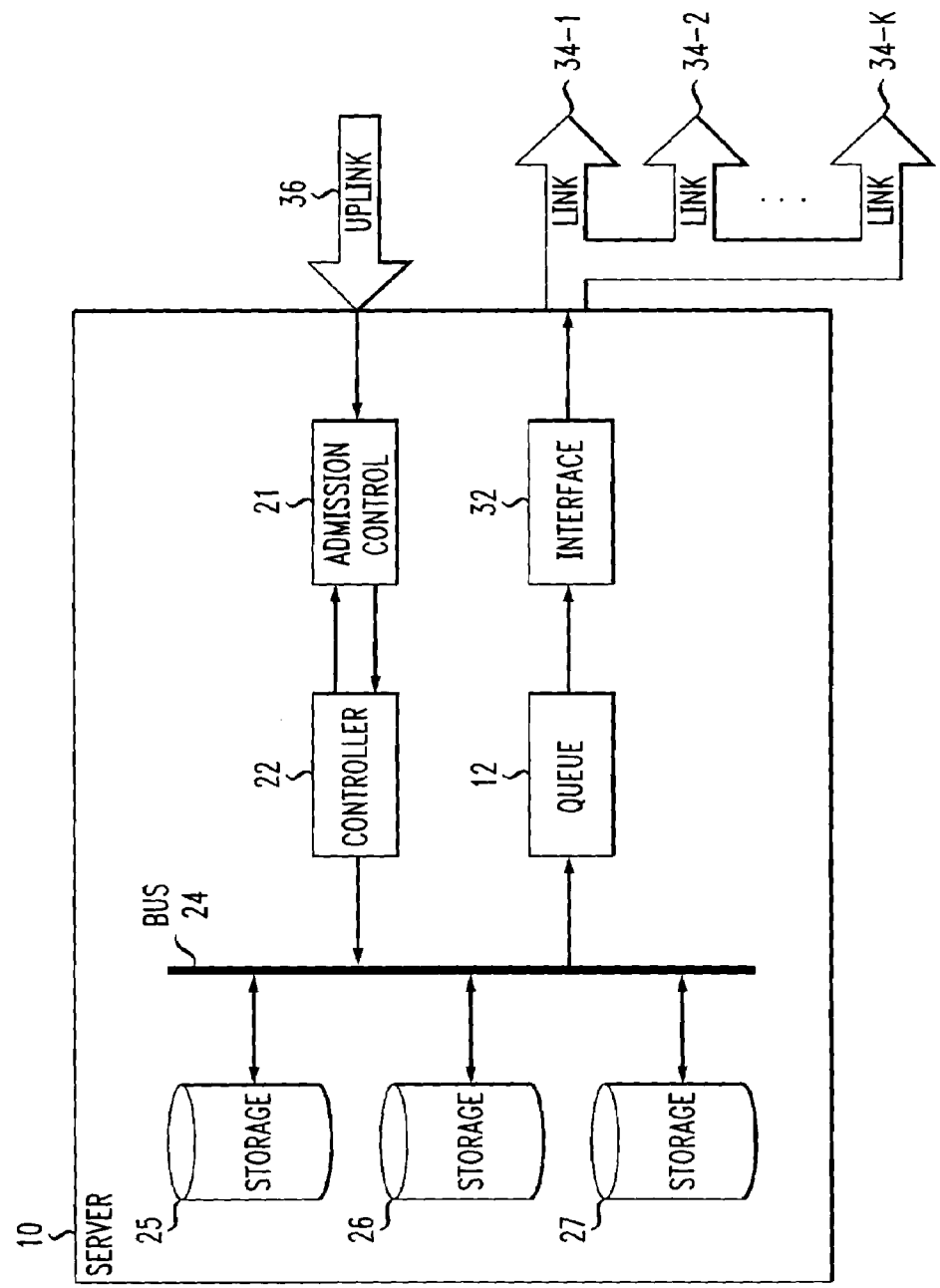
FIG. 2 illustrates the components of a central server, in accordance with one embodiment of the present invention.

FIG. 2 illustrates the features of a typical central server 10 that employs various embodiments of the present invention. The scheduling arrangement of the present invention may be employed in any central server system that is configured to receive a job request from a plurality of clients.

In FIG. 2, central server 10 is configured to transmit data items via links 34-1 through 34-k to a plurality of local channel servers/channels in response to requests received from clients via link 36. As shown in FIG. 1, these requests may take the form of requests for data items a, b and w by client devices 30a, 30b and 30w, respectively. According to one embodiment, central server 10 includes a plurality of storage devices such as 25–27, which are configured to provide the plurality of data items upon request.

Central server 10 includes, in one embodiment, an admission control circuit 21, which is configured to analyze an incoming request and determine whether the request will be acknowledged or denied. The request might be denied for any number of reasons, e.g., the person making the request is not authorized to make the request, the request is incompatible with the server system, etc. An input port of admission control circuit 21 is coupled to link 36, which is configured to deliver the job requests. Admission control circuit 21 receives and stores for each job request, among other things, the time the request arrives, the length of the request, the data item requested, and the bandwidth or data rate necessary to serve the request.

In accordance with one embodiment of the invention, controller 22 is a microprocessor. An input port of controller 22 is coupled to an output port of admission control circuit 21. Additionally, an output port of controller 22 is coupled to an input port of admission control circuit 21. Controller 22 employs the scheduling arrangement described herein, by performing the calculations and determining which job requests to transmit to a local channel server for servicing via the local channel server's corresponding channel. Pending job requests are stored in a memory buffer such as queue 12. Storage devices 25–27 are configured to provide data to an internal bus system 24 in response to signals provided by controller 22, although the invention is not limited in scope in that respect. Data retrieved from storage devices 25–27 is provided to the local channel servers via interface unit 32 and links 34-1 through 34-k.

It should also be noted that, although one embodiment of the invention is disclosed in the context of discrete functioning elements such as an admission control circuit and a controller, it is understood that different discrete functioning elements or software could be employed to carry out the present invention.

In one embodiment of the invention, admission control circuit 21 has prior knowledge of the arrival time of job requests to be scheduled by controller 22. A scheduling system based on such an arrangement is referred to as "off-line" scheduling. Thus, in an off-line scheduling arrangement, the system has knowledge of all the jobs that need to be serviced, and can determine the optimal schedule for the job requests prior to starting to service the job requests. The steps conducted by one embodiment of the present invention, which employs an off-line scheduling arrangement, are shown and described in FIG. 3. It is noted that the "off-line" scheduling arrangement in accordance with the present invention leads to an optimal scheduling benchmark against which other scheduling arrangements may be compared.

In another embodiment of the invention, admission control circuit 21 does not store all of the job requests before directing them to controller 22 or have prior knowledge of the arrival times of future job requests. A scheduling system based on such an arrangement is referred to as "on-line" scheduling. Unlike an off-line system, in which a series of calculations to find the optimal schedule is performed prior to actually servicing the job requests, an on-line system is one in which the controller determines a schedule, based upon job requests which have previously been processed, while simultaneously processing the currently pending job requests. The steps conducted by one embodiment of the present invention, which employs an on-line scheduling arrangement, are shown and described in FIG. 4.

Figure 3:
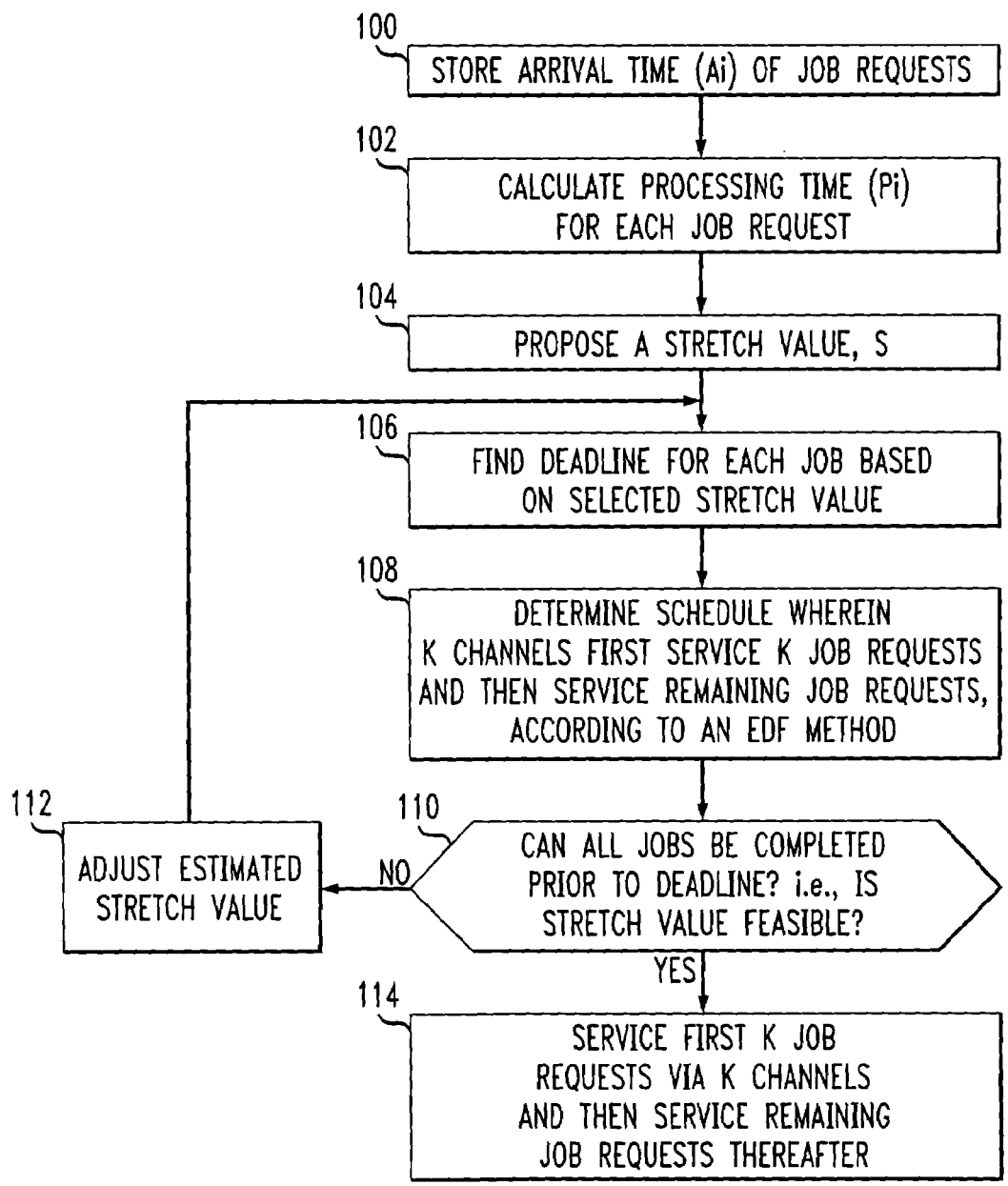
FIG. 3 is a flow chart which illustrates the steps of scheduling and processing a plurality of job requests in the off-line setting, in accordance with one embodiment of the present invention.

FIG. 3 is a flow chart which illustrates the steps of an off-line scheduling arrangement which schedules the transmission of a plurality of data items in response to job requests, referred to as the BASE scheduling method. At step 100, the arrival time, $A_i$, of a job request is stored by central server 10. The arrival time of the job request is the point in time when central server 10 receives the job request.

At step 102, central server 10 calculates a processing time, $P_i$, for the job request. The processing time for a job request is the amount of time it would take for central server 10 to complete the job request if central server 10 could service the job request immediately and without interruption, i.e., without the job request waiting for other jobs to finish before starting, and without the service of the job request being preempted by central server 10 to service other requests. In the preferred embodiment, central server 10 calculates the processing time as a function of the size of the data items, such as by dividing the size (i.e., in bytes) of the data item requested by the transmission speed of the channels (e.g., in bytes per second).

At step 104, central server 10 proposes a stretch value, S, to utilize in scheduling the job requests. A stretch value provides an indication of the delay experienced by each job request to complete, when the server processes many job requests concurrently. Specifically, a stretch value exists because, in the preferred embodiment of the invention, central server 10 employs preemption. Preemption is a scheduling technique in which a server alternates between a plurality of different pending job requests, servicing portions of each job request until eventually all of the job requests are complete. Thus, the stretch value is defined herein as a ratio equal to the time that central server 10 requires to service a particular job request while also serving other uncompleted job requests in the system, divided by the time that central server 10 would require to service that particular job request if no other job requests were required to be serviced. It should be noted though that, although a stretch value can exist for an individual job request, the stretch value is preferably not calculated separately for each individual job request but is instead proposed as a first step for application to the entire set of pending job requests, as will be shown in step 106 below. Initially, the proposed stretch value can be a random or arbitrarily chosen number or can be based on previously found stretch values.

Once step 104 is satisfied and a stretch value has been proposed, central server 10 proceeds to step 106. At step 106, central server 10 uses the proposed stretch value to calculate the deadlines, $D_i$, for all of the uncompleted job requests in the central server queue remaining to be serviced. For an uncompleted job request i, the deadline, $D_i$, is equal to the arrival time of that job, $A_i$, plus the product of the proposed stretch value, S, times the processing time, $P_i$, such that:

$$D_i = S \times P_i + A_i.$$

At step 108, once the deadline for each uncompleted job is calculated, central server 10 schedules the jobs, in one embodiment of the present invention, according to an earliest deadline first ("EDF") methodology. According to the EDF methodology, central server 10 initially schedules for service, via k local channel servers, the k job requests which have the earliest deadlines, as found in step 106, relative to all of the other jobs. As local channel servers complete the responses to their corresponding job requests, central server 10 then selects the next available job request with the earliest deadline and schedules it to be serviced by the available local channel servers. This process continues until all of the job requests have been scheduled.

At decision step 110, central server 10 inquires whether, if serviced according to the schedule determined by the EDF methodology, each and every one of the job requests will be completed prior to its respective deadline as calculated in step 106. If any job request is not able to be completed prior to its respective deadline, then the proposed stretch value is not feasible and the job requests are not serviced according to the schedule determined by the EDF methodology in step 108 of the current iteration.

Instead, central server 10 preferably increases the proposed stretch value at step 112. From step 112, central server 10 returns to step 106. Central server 10 re-performs steps 106 to 110 in order to check the feasibility of the new proposed stretch value. Central server 10 repeats these steps iteratively, progressively increasing the stretch value, until a feasible stretch value is found which enables all of the job requests, when scheduled in step 108 according to the EDF methodology, to be completed within their respective deadlines (as calculated in step 106).

When a feasible stretch value is found, central server 10 proceeds to step 114, where it services all of the job requests in the order dictated by the EDF schedule, as found in step 108 of the current iteration. Specifically, central server 10 services, via the k local channel servers, the k job requests which have the earliest deadlines. Central server 10 then services the following job requests with the earliest deadlines via the first available local channel servers that complete servicing their job requests.

In accordance with one embodiment of the invention, the schedule determined by controller 22 incorporates migration between available local channel servers. For instance, if a job request for a first data item is currently being serviced by a first channel, an un-serviced portion of the data item may be returned from that local channel server to the central server to be serviced by a second channel, in order that the first channel instead services a subsequently arriving job request for a second data item. This may occur when the second data item is relatively small, and the job requesting it has an earlier deadline than the job request for the larger first data item. This migration scheduling arrangement prevents the delay in servicing the small second data item from adversely affecting the performance of the schedule.

In one embodiment of the invention, the adjustment at step 112 (of the flowchart in FIG. 3) to the proposed stretch value is accomplished by doubling the previously proposed stretch value. In yet another embodiment, once the system determines that a feasible stretch value falls between two integers, k and 2k, the feasible stretch value is adjusted further by performing a binary search for an optimal feasible stretch value. The optimal feasible stretch value is the smallest feasible stretch value that enables all of the job requests, when scheduled in step 108 according to the EDF methodology, to be completed within their respective deadlines (as calculated in step 106).

This off-line scheduling arrangement, in which server 10 calculates an adaptive schedule for a known set of pending job requests by utilizing the EDF methodology, is referred to as the BASE method. Because the set of pending job requests is known, the BASE method is able to generate a near optimal schedule to serve the job requests. However, the BASE method is not always desirable to use. For instance, while it is possible to utilize the BASE method in an on-line setting, it may not be practical to do so. This follows because the BASE scheduling method requires the controller to determine a schedule based on all incoming job requests, which requires large amounts of memory and processing power. Instead, in the on-line setting, prior stretch values, or modified stretch values are utilized, as will be discussed below.

Figure 4:
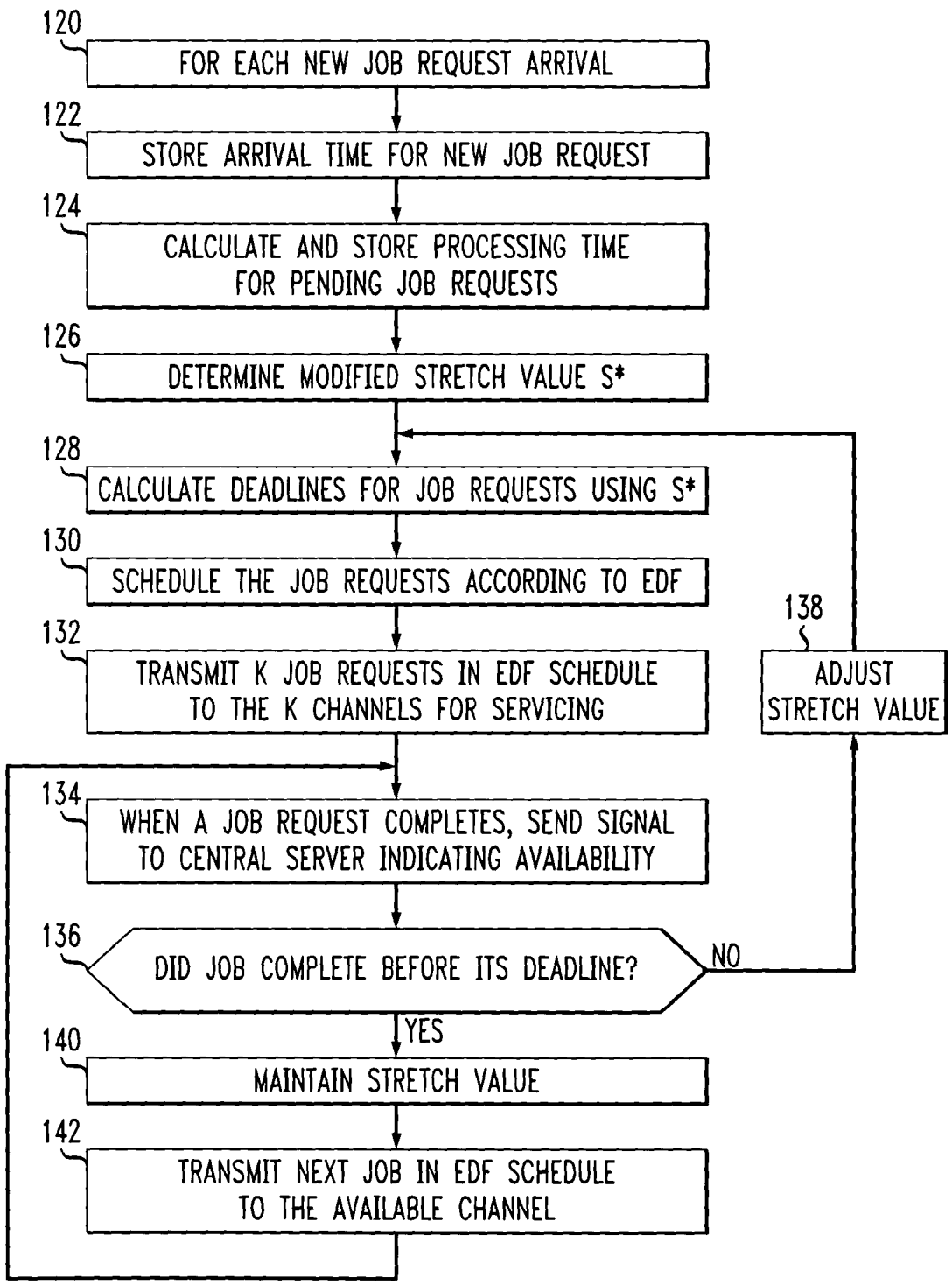
FIG. 4 is a flow chart which illustrates the steps of scheduling and processing a plurality of job requests in the on-line setting, in accordance with one embodiment of the present invention.

FIG. 4 is a flow chart which illustrates the steps of an on-line scheduling arrangement which adaptively schedules the transmission of a plurality of data items in response to a continuous stream of job requests, referred to as the MAX scheduling method. As previously mentioned, an on-line scheduling arrangement is one which must determine how to schedule the job requests based upon job requests that have already been received. Thus, a server system which employs an on-line scheduling arrangement begins servicing the job requests before determining an optimal stretch value.

At step 120 of the flow chart, a new job request arrives at central server 10. Typically in the on-line setting, central server 10 will currently be servicing a plurality of pending job requests when the new request arrives. At step 122, the arrival time, $A_i$, of the newly arrived job request is stored by central server 10.

At step 124, central server 10 calculates and stores a processing time, $P_i$, of the arrived job request. As shown and described in reference with FIG. 3, the processing time for a job request is the amount of time it would take for central server 10 to complete the job request if central server 10 could service the job request immediately and without interruption, i.e., without the job request waiting for other jobs to finish before starting, and without the service of the job request being preempted by central server 10 to service other requests. As previously indicated, in the preferred embodiment, central server 10 calculates the processing time as a function of the size of the data items, such as by dividing the size (i.e., in bytes) of the data item requested by the transmission speed of the channels (e.g., in bytes per second).

In accordance with one embodiment of the invention, instead of considering all of the job requests arrived to the server, the on-line scheduling arrangement considers the job requests that have arrived during a history window, defined by a history window parameter. A history window parameter comprises a specified set of job requests having n number of job requests, where n is an integer. The value of n is advantageously chosen by the operator of server system 10. While it is possible that n equals the total number of jobs serviced by the system, it may be desirable to avoid storing or calculating arrival times and processing times for the entire history at every arrival. Therefore, in one embodiment, n is a finite number in the range of 10 to 100, corresponding to the last 10 to 100 jobs which were serviced by the system immediately proceeding the arrival of the presently arrived job. Not only does the selection of an n value in this range control the cost of scheduling, but also prevents a momentary surge of arrivals a long time ago from inducing the controller to compute a large processing time ratio ever after.

At step 126, central server 10 determines a modified stretch value, S*. The modified stretch value S* is the maximum stretch value for a completed job request found during a specified history window parameter. At step 128, central server 10 uses the modified stretch value, S*, to calculate the deadlines, D, for all of the uncompleted job requests remaining to be serviced. In accordance with one embodiment, this includes the job requests that are currently being serviced via each of the local channel servers and the job requests that are stored in queue 12 waiting to be serviced. For each job request i, the deadline, $D_i$, is equal to the arrival time of that job request, $A_i$, plus the product of the modified stretch value, S*, times the processing time, $P_i$, such that:

$$D_i = S^* \times P_i + A_i.$$

At step 130, in accordance with one embodiment of the present invention, central server 10 determines a schedule for the job requests in accordance with an EDF methodology. According to the EDF methodology, central server 10 initially schedules for service, by providing the k local channel servers, the k job requests which have the earliest deadlines. Central server 10 then selects the next job requests with the earliest deadlines and schedules them to be serviced by the first available local channel servers that complete servicing their job requests.

At step 132, central server 10 transmits the k job requests having the earliest deadlines, according to the EDF schedule determined in step 130, to the k local channel servers for transmission to the clients that requested the data item. At step 134, when a job request has been completely serviced via a particular channel, the local channel server that corresponds to the channel sends a signal to central server 10. The signal indicates to the central server that the job request is complete and that the channel is now available to service another job request. In addition, according to one embodiment, upon receiving the signal, central server 10 determines the completion time of the job request.

At step 136, central server 10 determines if, at the modified stretch value, S*, the completed job request was completed prior to its respective deadline. If so, the modified stretch value is feasible and the system proceeds to step 140, where central server 10 maintains the current modified stretch value. At step 142, central server 10 then transmits to the available channel the job request in its queue that has the next earliest deadline. The method then returns to step 134, which is performed when the next job request is completed via one of the channels.

If, using the modified stretch value, S*, the completed job request is not completed prior to its corresponding deadline, then the modified stretch value is not feasible. The method then proceeds to step 138, and the modified stretch value is adjusted. After step 138, the method then returns to step 128, and the method repeats, i.e., central server 10 recalculates the deadlines for all of the job requests, reschedules the job requests according to the EDF methodology, and transmits the k job requests having the earliest deadlines to the k local channel servers to be serviced via the corresponding channels. However, in accordance alternative embodiment of the invention, the deadlines calculated in step 128 remain constant even after the modified stretch value is adjusted at step 138, and the adjusted modified stretch value is used to calculate deadlines for the newly arriving job requests only.

As may be the case, a subsequent job request will arrive at central server 10 to be serviced while each of the channels are processing the existing job requests. If this is the case, then central server 10 returns to step 120 of the flow chart to re-perform steps 120 through 140. Thus, the EDF schedule of pending job requests determined by central server 10 is updated to include the newly arrived job request.

As previously discussed, in accordance with one embodiment of the invention, the schedule determined by controller 22 of central server 10 incorporates migration. For instance, if a job request for a first data item is currently being serviced by a first channel, an un-serviced portion of the data item may be returned from that local channel server to the central server to be serviced by a second channel, in order that the first channel instead service a subsequently arriving job request for a second data item. This may occur when the second data item is relatively small, and the job requesting it has an earlier deadline than the job request for the larger first data item. This migration scheduling arrangement prevents the delay in servicing the small second data item from adversely affecting the overall performance of the schedule.

Each of the methods discussed above, which determine a modified stretch value, utilize the EDF methodology to schedule the job requests. It is possible, however, to use other scheduling methodologies. For instance, the SRPT method, which schedules the pending job requests according to the remaining time to process each request, can be utilized.

As previously mentioned, the present invention seeks to find a schedule that balances the conflicting requirements of the individual performance for each job request with the global performance of the system, such that the system is responsive to each job request and avoids starvation of any job request. In other words, the optimal schedule balances the need to minimize the worst case completion time of a job request and the need to minimize the average response time for the job requests. In addition, the optimal schedule balances the need to minimize the worst case stretch of a job request and the need to minimize the average stretch values for all of the job requests.

In order to measure the effectiveness of the BASE and MAX algorithms, their performance can be compared to algorithms which are known to be near-optimal with respect to certain metrics. For instance, a metric which is employed in order to minimize the maximum stretch value (hereinafter "MaxStr") experienced when employing multiple channels to service a plurality of job requests is referred to as OPT. The OPT algorithm is an off-line algorithm similar to BASE, except that unlike the BASE algorithm, the OPT algorithm calculates and schedules pending job requests so as to minimize the MaxStr at specific time intervals, by designating that each user may have only one outstanding job request at any time.

FIG. 5 illustrates some of the performance characteristics of the OPT algorithm in a model of the multi-channel environment. The performance was determined for a model in which a total downlink bandwidth of 128 Kbits/second was employed, divided between a number of channels ranging from 5 to 20 channels (thus rendering the bandwidth of each channel within a range between 6.4 and 25.6 Kbits/second). For instance, for a given set of job requests, the minimum MaxStr obtained by the OPT algorithm is 23.2, while the average stretch of all of the job requests was 9.8 and the average response time for all of the jobs was 12.9 seconds.

FIG. 6 illustrates the performance of the SRPT, MAX and BASE algorithms as employed by a central server that schedules job requests for service via multiple channels, in accordance with the model described above. As shown, the MAX algorithm has the lowest MaxStr of all of these algorithms, at 23.98, which is only slightly higher than the OPT algorithm (which is known to minimize the MaxStr value). In addition, the MAX algorithm has the lowest maximum response time of the three algorithms, at 11,775 seconds, while having slightly higher, but still fairly low, average stretch and average response time values, at 1.3 and 5.2 seconds, respectively. By contrast, the SRPT algorithm of the prior art has a significantly higher MaxStr value at 34.4.

Unexpectedly, the MAX algorithm also has a lower MaxStr than the BASE algorithm (the BASE algorithm has a MaxStr of 24.09), even though the BASE algorithm is known to be nearly optimal in this regard in the single channel context. This result illustrates that an optimal algorithm employed in a communication system having only one channel is not necessarily the optimal algorithm to employ in a multiple-channel communication system.

Thus, since it is important when making a quality of service guarantee to clients to minimize the MaxStr, the MAX and BASE algorithms perform better than the SRPT algorithm. It is also important to note that the MAX algorithm, which is an on-line algorithm, is more practical than the BASE algorithm, which is an off-line algorithm.

While there has been shown and described particular embodiments of the invention, it will be obvious to those skilled in the art that changes and modifications can be invention, made therein without departing from the invention, and therefore, the appended claims shall be understood to cover all such changes and modifications as fall within the true spirit and scope of the invention.

What is claimed is:

1. A method for scheduling responses in a point-to-point communication system having k channels, the method comprising the steps of:
   receiving at a central server a plurality of job requests;
   determining an adaptive schedule for transmitting, via said k channels, data responsive to said job requests, wherein the servicing of a first job request via a first channel is interrupted, an unserviced portion of said data is returned from a local channel server to said central server, and said unserviced portion is subsequently serviced via a second channel so as to service a second job request via said first channel in accordance with an updated schedule; and
   calculating a deadline for each of said plurality of job requests, wherein each such deadline is calculated based on a processing time corresponding to each said job request, a stretch value corresponding to the processing time, and an arrival time corresponding to each said job request, wherein said schedule for processing said job requests is adaptively determined such that each said job request is serviced via said channels within said deadline corresponding to each said job request.

2. The method of claim 1, further comprising the step of servicing said job requests via a plurality of local channel servers in accordance with said adaptive schedule.

3. The method of claim 1, wherein said step of determining an adaptive schedule further comprises the step of updating said schedule upon the arrival of a new job request at said central server.

4. The method of claim 1, wherein said step of determining an adaptive schedule further comprises the step of updating said schedule upon the arrival at said central server of said interrupted first job request.

5. The method of claim 1, wherein, in the step of calculating a deadline, the deadline, $D_i$, for each of said plurality of job requests is given by $D_i = S \times P_i + A_i$, –where $P_i$ is a processing time corresponding to each said job request, $A_i$ is an arrival time corresponding to each said job request, and S is a stretch value.

6. The method of claim 1, wherein said processing time further comprises a value corresponding to the size of each said job request divided by a channel bandwidth.

7. The method of claim 1, further comprising the step of proposing said stretch value.

8. The method of claim 7, further comprising the step of calculating said deadlines for each of said job requests as a function of said proposed stretch value.

9. The method of claim 8, wherein said scheduling step further comprises scheduling said job requests, at said proposed stretch value, according to an "earliest deadline first" arrangement.

10. The method of claim 9, wherein said stretch value is a feasible stretch value if, when processed in an order dictated by said "earliest deadline first" arrangement, a completion time of each and every said job request is prior to said corresponding deadline for each said job request at said feasible stretch value.

11. The method of claim 10, further comprising the steps of:
    iteratively adjusting said stretch value until said stretch value is a feasible stretch value; and
    after finding said feasible stretch value, processing said job requests in an order dictated by said "earliest deadline first" arrangement, said "earliest deadline first" arrangement corresponding to said stretch values determined in the latest iteration.

12. The method of claim 11, wherein said adjusting step further comprises adjusting said proposed stretch value by doubling said proposed stretch value.

13. The method of claim 12, wherein said feasible stretch value further comprises an optimal feasible stretch value, said method further comprising the step of adjusting said proposed stretch value until a feasible stretch value is found, said optimal feasible stretch value corresponding to the smallest feasible stretch value that permits said each and every job request to have a completion time prior to said deadline of said job request at said optimal feasible stretch value.

14. The method of claim 13, wherein said adjusting step further comprises performing a binary search for said optimal feasible stretch value after said controller determines that said feasible stretch value falls between said proposed stretch value and double said proposed stretch value.

15. The method of claim 5, wherein said plurality of job requests further comprises a set having n number of job requests, wherein n is an integer.

16. The method of claim 15, wherein said integer n has a value that is equal to a total number of job requests processed by said server system.

17. The method of claim 15, wherein said integer n has a value that is less than a total number of job requests processed by said server system.

18. The method of claim 1, further comprising the step of processing a plurality of pending job requests prior to receiving at said central server said new job request, wherein said communication system is an on-line system.

19. The method of claim 18, further comprising the step of calculating a deadline, $D_i$, for each of said received and pending job requests, given by $D_i = S^* \times P_i + A_i$, wherein $P_i$ is a processing time corresponding to each said job request, $A_i$ is an arrival time corresponding to each said job request, and $S^*$ is a modified stretch value estimated based on job requests arrived during a history window defined by a history window parameter.

20. The method of claim 19, wherein said processing time further comprises a value corresponding to the size of each said job request divided by a channel bandwidth.

21. The method of claim 19, wherein said modified stretch value corresponds to a maximum stretch value for all of said job requests arrived within said history window.

22. The method of claim 19, wherein said scheduling step further comprises scheduling said job requests according to an "earliest deadline first" arrangement, said "earliest deadline first" arrangement utilizing said deadlines calculated as a function of said modified stretch value.

23. The method of claim 22, further comprising the step of adjusting said stretch value upon an arrival of a new job request.

24. The method of claim 22, further comprising the step of adjusting said stretch value upon said completion of any said job request.

25. An apparatus for use in scheduling responses in a point-to-point communication system having k channels, the apparatus comprising:
 a central server configured: (i) to receive a plurality of job requests; (ii) to determine an adaptive schedule for transmitting, via said k channels, data responsive to said job requests, wherein the servicing of a first job request via a first channel is interrupted, an unserviced portion of said data is returned from a local channel server to said central server, and said unserviced portion is subsequently serviced via a second channel so as to service a second job request via said first channel in accordance with an updated schedule; and (iii) to calculate a deadline for each of said plurality of job requests, wherein each such deadline is calculated based on a processing time corresponding to each said job request, a stretch value corresponding to the processing time, and an arrival time corresponding to each said job request, wherein said schedule for processing said job requests is adaptively determined such that each said job request is serviced via said channels within said deadline corresponding to each said job request.

26. An article of manufacture for storing one or more software programs for use in a central server for scheduling responses in a point-to-point communication system having k channels, wherein the one or more programs when executed implement the-steps of:
 determining an adaptive schedule for transmitting, via said k channels, data responsive to received job requests, wherein the servicing of a first job request via a first channel is interrupted, an unserviced portion of said data is returned from a local channel server to said central server, and said unserviced portion is subsequently serviced via a second channel so as to service a second job request via said first channel in accordance with an updated schedule; and
 calculating a deadline for each of said plurality of job requests, wherein each such deadline is calculated based on a processing time corresponding to each said job request, a stretch value corresponding to the processing time, and an arrival time corresponding to each said job request, wherein said schedule for processing said job requests is adaptively determined such that each said job request is serviced via said channels within said deadline corresponding to each said job request.

* * * * *